(12) United States Patent
Rapisarda

(10) Patent No.: US 11,274,818 B1
(45) Date of Patent: Mar. 15, 2022

(54) DESIRED DESIGN LIT UP BY A LIGHT MATERIAL EFFECT

(71) Applicant: Carmen Rapisarda, Apple Valley, CA (US)

(72) Inventor: Carmen Rapisarda, Apple Valley, CA (US)

(*) Notice: Subject to any disclaimer, the term of this patent is extended or adjusted under 35 U.S.C. 154(b) by 0 days.

(21) Appl. No.: 17/221,825

(22) Filed: Apr. 4, 2021

Related U.S. Application Data

(63) Continuation-in-part of application No. 17/013,857, filed on Sep. 8, 2020, now abandoned, which is a continuation-in-part of application No. 16/716,780, filed on Dec. 17, 2019, now Pat. No. 10,767,851, which is a continuation-in-part of application No. 16/440,153, filed on Jun. 13, 2019, now Pat. No. 10,520,179, which is a continuation-in-part of application No. 16/184,914, filed on Nov. 8, 2018, now Pat. No. 10,364,973, which is a continuation of application No. 15/828,924, filed on Dec. 1, 2017, now Pat. No. 10,145,546, which is a continuation-in-part of application No. 15/582,629, filed on Apr. 29, 2017, now Pat. No. 9,863,615, which is a continuation-in-part of application No. 15/227,816, filed on Aug. 3, 2016, now Pat. No. 9,706,803, which is a continuation-in-part of application No. 15/227,752, filed on Aug. 3, 2016, now Pat. No. 9,557,049, which is a continuation-in-part of application No. 15/227,723, filed on Aug. 3, 2016, now Pat. No. 9,506,643, which is a continuation-in-part of application No.
(Continued)

(51) Int. Cl.
*F21V 23/00* (2015.01)
*F21V 23/04* (2006.01)
*F21L 4/00* (2006.01)
*F21V 31/00* (2006.01)
*F21V 33/00* (2006.01)
*A43B 3/00* (2006.01)
*F21V 19/00* (2006.01)
*H05B 47/10* (2020.01)
*H05B 47/12* (2020.01)
*F21Y 115/10* (2016.01)
*F21W 121/06* (2006.01)

(52) U.S. Cl.
CPC ............ *F21V 23/005* (2013.01); *A43B 3/001* (2013.01); *F21L 4/00* (2013.01); *F21V 19/0025* (2013.01); *F21V 23/045* (2013.01); *F21V 23/0414* (2013.01); *F21V 31/005* (2013.01); *F21V 33/0008* (2013.01); *H05B 47/10* (2020.01); *H05B 47/12* (2020.01); *F21W 2121/06* (2013.01); *F21Y 2115/10* (2016.08)

(58) Field of Classification Search
CPC .. F21V 23/005; F21V 23/0414; F21V 23/045; F21V 31/005; F21V 33/0008; H05B 47/12; H05B 47/10; A43B 3/001; F21L 4/00; F21Y 2115/10; F21W 2121/06
USPC .......................................................... 362/103
See application file for complete search history.

(56) References Cited

U.S. PATENT DOCUMENTS

| | | | |
|---|---|---|---|
| 7,857,477 B2* | 12/2010 | Wilborn | A41D 27/085 362/103 |
| 2006/0221596 A1* | 10/2006 | Chang | A43B 3/0005 362/103 |
| 2008/0253108 A1* | 10/2008 | Ellenburg | A43B 3/001 362/103 |

* cited by examiner

*Primary Examiner* — Andrew J Coughlin
*Assistant Examiner* — Jessica M Apenteng
(74) *Attorney, Agent, or Firm* — Roy L. Anderson

(57) ABSTRACT

A desired design is created by use of clear and opaque sections and then illuminated by a light material viewing effect in an article of manufacture.

15 Claims, 14 Drawing Sheets

Related U.S. Application Data

14/709,203, filed on May 11, 2015, now Pat. No. 9,445,641.

(60) Provisional application No. 62/064,958, filed on Oct. 16, 2014, provisional application No. 62/062,284, filed on Oct. 10, 2014, provisional application No. 62/061,110, filed on Oct. 7, 2014, provisional application No. 62/019,287, filed on Jun. 30, 2014, provisional application No. 61/991,841, filed on May 12, 2014.

DESIRED DESIGN LIT UP BY A LIGHT MATERIAL EFFECT

CROSS REFERENCE TO RELATED APPLICATIONS

This application is a continuation-in-part application of U.S. Ser. No. 17/013,857, filed Sep. 8, 2020, which itself was a continuation-in-part application of U.S. Ser. No. 16/716,780, filed Dec. 17, 2020, now U.S. Pat. No. 10,767,851, which itself was a continuation-in-part application of U.S. Ser. No. 16/440,153, filed Jun. 13, 2019, now U.S. Pat. No. 10,520,179, which itself was a continuation-in-part application of U.S. Ser. No. 16/184,914, filed Nov. 8, 2018, now U.S. Pat. No. 10,364,973, which itself was a continuation application of U.S. Ser. No. 15/828,924, filed Dec. 1, 2017, now U.S. Pat. No. 10,145,546, which itself was a continuation-in-part application of U.S. Ser. No. 15/582,629, filed Apr. 29, 2017, now U.S. Pat. No. 9,863,615, which itself was a continuation-in-part of U.S. Ser. No. 15/227,816, filed Aug. 3, 2016, now U.S. Pat. No. 9,706,803, which itself was a continuation-in-part application of U.S. Ser. No. 15/227,752, filed Aug. 3, 2016, now U.S. Pat. No. 9,557,049, which itself was a continuation-in-part application of U.S. Ser. No. 15/227,723, filed Aug. 3, 2016, now U.S. Pat. No. 9,506,643, which itself was a continuation-in-part application of U.S. Ser. No. 14/709,203, filed May 11, 2015, now U.S. Pat. No. 9,445,641, the disclosures of all of which are specifically incorporated herein by reference in their entirety.

U.S. Ser. No. 14/709,203 is a non-provisional utility application that claims priority from the following provisional patent applications, the disclosures of all of which are specifically incorporated herein in their entirety by reference: U.S. Ser. No. 61/991,841, filed May 12, 2014, entitled "LED Lighting Module;" U.S. Ser. No. 62/019,287, filed Jun. 20, 2014, entitled "LED Embedded Wire;" U.S. Ser. No. 62/061,110, filed Oct. 7, 2014, entitled "Footwear with Light Effect Material;" U.S. Ser. No. 62/062,284, filed Oct. 10, 2014, entitled "Footwear with Light Effect Material;" and U.S. Ser. No. 62/064,958, entitled "Footwear with Light Effect Material."

FIELD OF THE INVENTION

The present invention is generally in the field of articles of manufacture, and particularly clothing and footwear, which includes a lighted effect, an example of which is created using a LED lighting module.

BACKGROUND OF THE INVENTION

Lighting systems have been used before both with footwear and with clothing, examples of which are set forth in my prior U.S. Pat. Nos. 5,649,755 and 7,347,577, the disclosures of which are specifically incorporated herein by reference. If a lighting module is to be used with clothing, it must not only be durable, but it must also be washable. One way this has been done before is to include both the lighting module and the lights within a pouch that is waterproof, such as is taught in U.S. Pat. No. 7,857,477. However, such a pouch has a number of limitations, and the present invention therefore seeks to improve such prior devices.

SUMMARY OF THE INVENTION

The present invention is generally directed to creating a desired design by use of clear and opaque sections and then illuminating the desired design by a light material viewing effect in an article of manufacture.

Accordingly, it is a primary object of the present invention to provide an article of manufacture with a desired design illuminated by a light material viewing effect.

This and further objects and advantages will be apparent to those skilled in the art in connection with the drawings and the detailed description of the preferred embodiment set forth below.

BRIEF DESCRIPTION OF THE DRAWINGS

FIG. 1 illustrates an LED spaced behind a light effect material while

FIG. 3 illustrates a light effect material in which a surface of a material, such as PVC, creates the light effect while

FIG. 7 illustrates a sheet of light effect material with square repeating patterns while FIG. 8 provides details regarding one such square pattern and adjacent squares. FIG. 9 is a side view that conceptually illustrates smaller squares, as illustrated in FIG. 8, some of which are creating visible light effects and some of which are not.

FIG. 15 is an exploded view which illustrates a lighting assembly while

FIGS. 18-19 illustrate how a light effect can enhance a visual design in a light effect material (or metalized layer), FIG. 18 showing the visual design without the light effect activated while FIG. 19 shows the design with the light effect activated.

FIG. 22B illustrates a reflected light material viewing effect in accordance with the present invention in which a viewer perceives reflected light as a dispersed light effect viewing pattern rather than as a reflective light pattern while

FIG. 23 is an exploded view which illustrates a desired design in a clear portion of a material insert while

DETAILED DESCRIPTION OF THE INVENTION

The concept of use of a light effect material is disclosed and discussed in U.S. Pat. Nos. 9,445,641, 9,506,643, 9,557,049 and 9,706,803. Light effect material is maintained at an acceptable distance from a light source using one or more LEDs behind it relative to a viewer so as to create a visually interesting effect for the viewer viewing the light source through the light effect material. More particularly, the general effect of the light effect material is that the light effect viewed by the viewer is over a larger viewing area than what the viewer sees along the exact same viewing path with the light effect material removed from the viewing path, and the light effect is more visually interesting. The light effect material may be incorporated into a garment inside of an application or patch, and multiple layers of the light effect material may be used.

A light effect material creates a visually interesting effect in which light from an LED behind such material, relative to a viewer on the other side of the material, will see a dispersed pattern of light created by the material, when the light effect material is located at an acceptable distance between a viewer and one or more LEDs. A light effect material must be sufficiently sheer or transparent to allow light from an LED to pass through it and be seen by a viewer's eye, but it must also have a structure that allows some of the light from the LED to reflect along its structural components to disperse light and create a noticeable optical effect. It is for this reason that a light effect material, if it is located directly adjacent to an LED, will have little or no noticeable optical effect, whereas the same will be true if it is located too far away from an LED. In choosing a material with dispersive elements, it is especially desirable to choose a clear or white material with prismatic properties instead of a colored material when the material is being used with multi-colored LEDs, so that the color of the material with reflective elements does not interfere with the color of the LEDs. In connection with such a light effect material, it is important that the reflective and/or refractive elements are sufficiently small so that they give the appearance of creating multiple points of light for each LED, rather than simply acting as a prism or a large multifaceted lens. Also, it is especially useful if multiple LEDs are spaced apart from light effect material so that multiple LEDs, especially of different colors, can overlap each other to create blended light effects.

Figure 1:
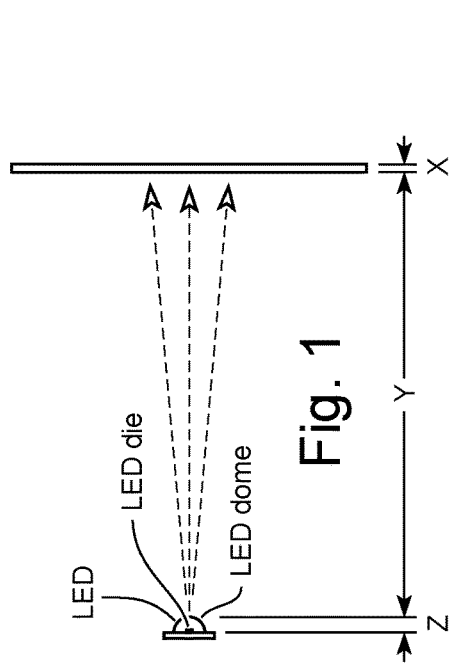

FIG. 1 illustrates an LED spaced apart from a light effect material (the LED can be a bi-pin LED, an axial lead LED or a surface mount LED). The LED has a light emitting die which rests on a base and is covered with a dome. The light emitting die of the LED emits light and, in one especially preferred embodiment, the light effect material has active elements which create the light effect that are roughly the size, or within several orders of size magnitude, as that of the width of the semiconductor die used in an LED. Also, although the distance Y between the LED and the light effect material can vary, it has been disclosed that a distance of around 10 to 2000 times that of the LED (Z in FIG. 1) is effective where the light effect material has a thickness X which is roughly the same as Z.

Figure 3:
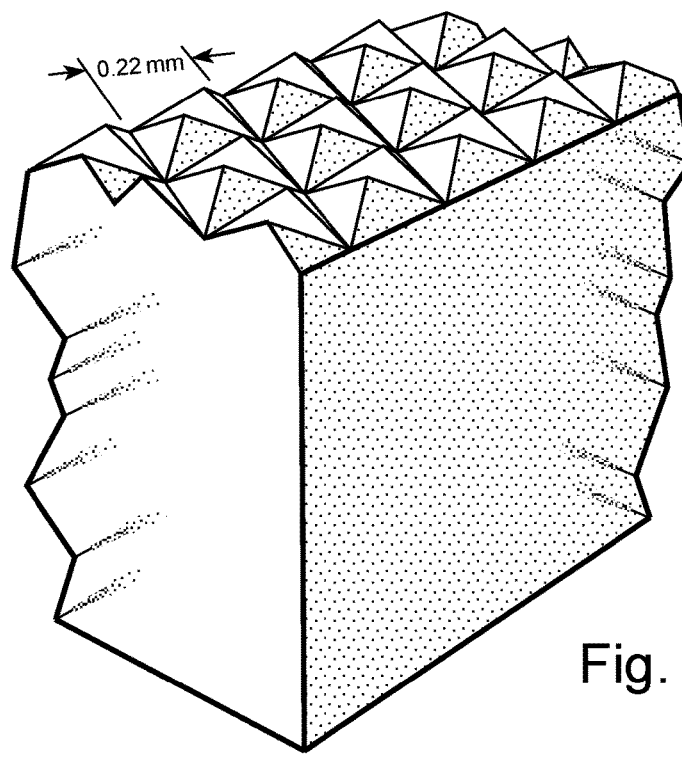
Figure 4:
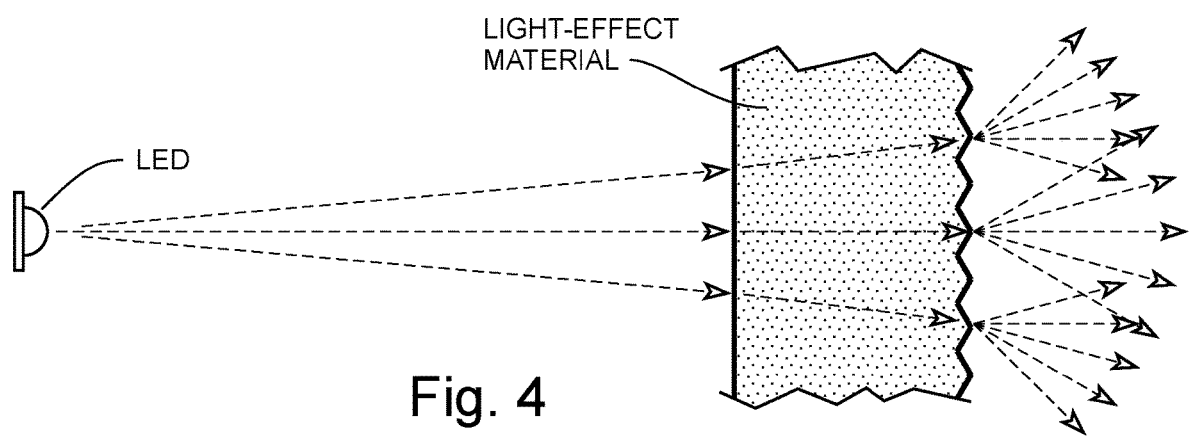
FIG. 4 illustrates use of the light effect material illustrated in FIG. 3.
Figure 8:
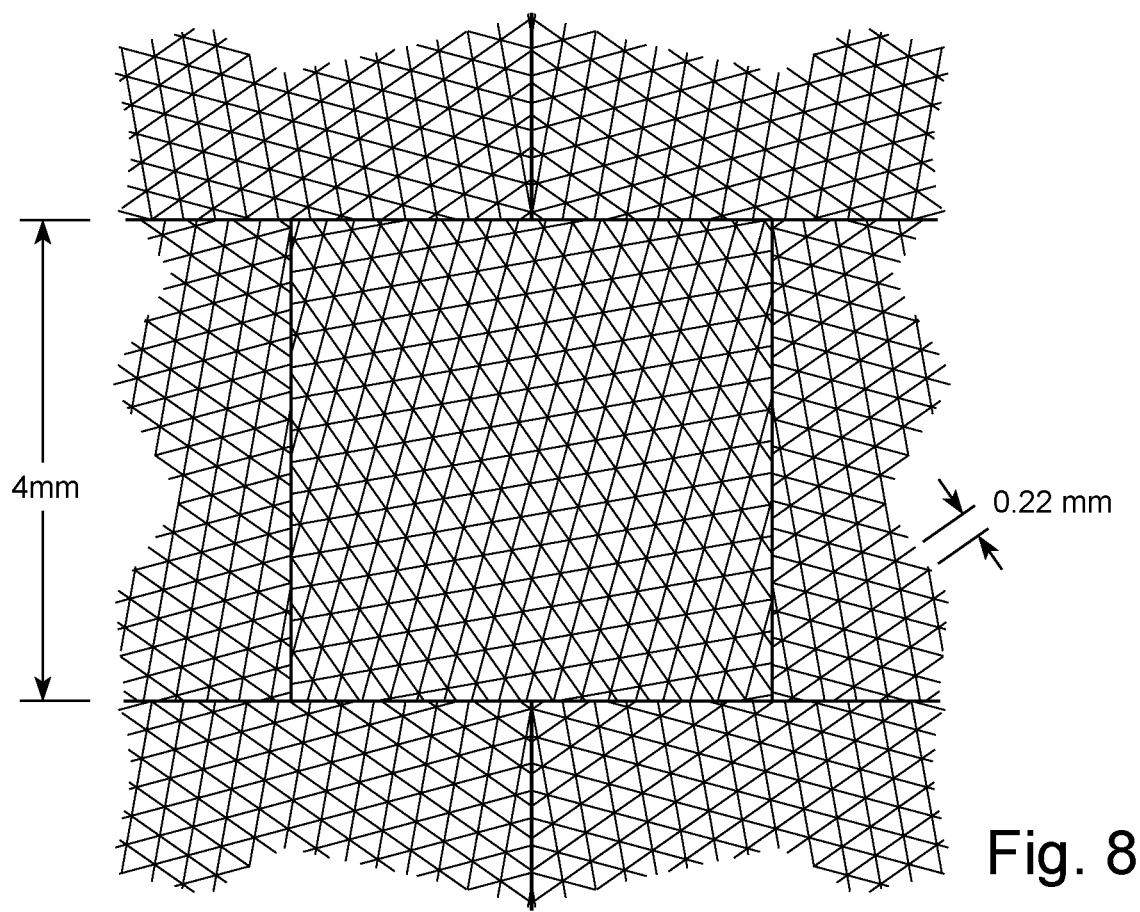

An example of a material that can function as a light effect material, which is an especially preferred embodiment, is a material with microscopic reflective and/or refractive elements on its outer surface relative to an LED (meaning that rays of light emitted from the LED will pass into an inner surface of the light effect material and then exit the light effect material at its outer surface and then continue on to a viewer) that serve to disperse light. One example of such a material is illustrated in FIGS. 3 and 8. In this example the light effect material is created as a surface layer of a larger piece of material, such as PVC or polyurethane, and the microscopic reflective and/or refractive elements can be machined or cut into the sheet or created by a molding process. The reflective and/or refractive elements in this example have a pyramidal shape (see FIG. 3) when viewed up close, but alternating squares of such shapes are configured at different angles as is illustrated in FIG. 8 in which the triangular lines represent the base lines of the pyramidal shapes illustrated in FIG. 3 and the top pyramidal points of FIG. 3 would be located in the centers of the triangles shown in FIG. 8 (except that such points and the angled surfaces converging at such points are not shown so that the size of the pyramidal base lines can be accurately set forth). Note also that the elements extend away from the surface relative to the location of one or more LEDs, as is illustrated in FIG. 4.

Figure 7:
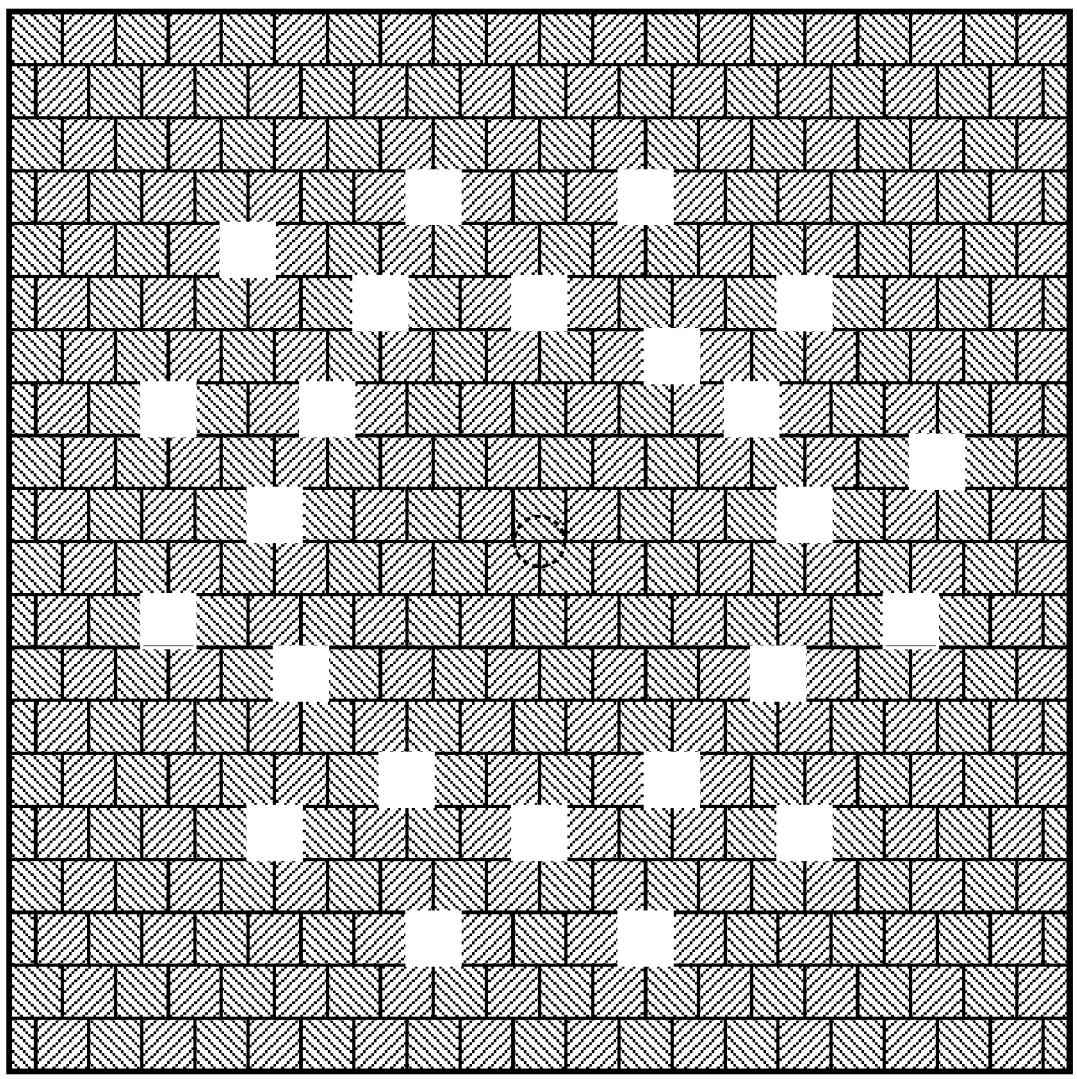
FIGS. 7-9 are related to the light effect material illustrated in FIG. 3.
Figure 9:
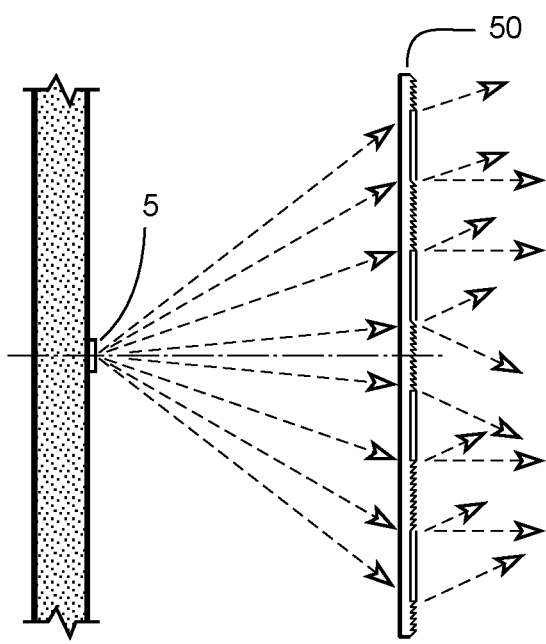

In connection with the light effect material illustrated in FIGS. 3 and 8, alternating squares of repeating patterns, each different from an adjacent square, help create a mosaic like surface having microscopic surfaces. Due to the differences in the microscopic elements of such light effect material, some squares of microscopic surfaces may create a light effect that can be viewed by a viewer, while others will not, which is conceptually illustrated in FIG. 9 as a simple alternating pattern of squares that do and not create a light effect. (In connection with FIG. 9, it is worth noting that the physical size of the LED semiconductor die is actually roughly the same as a single base line of one of the pyramids of one of the squares illustrated by FIG. 8, but the LED, for purposes of illustration only, is not drawn to such scale in FIG. 9). However, the alternating patterns can be designed in more complex patterns to create desired effects, examples of which are illustrated in FIGS. 5 and 7.

Figure 5:
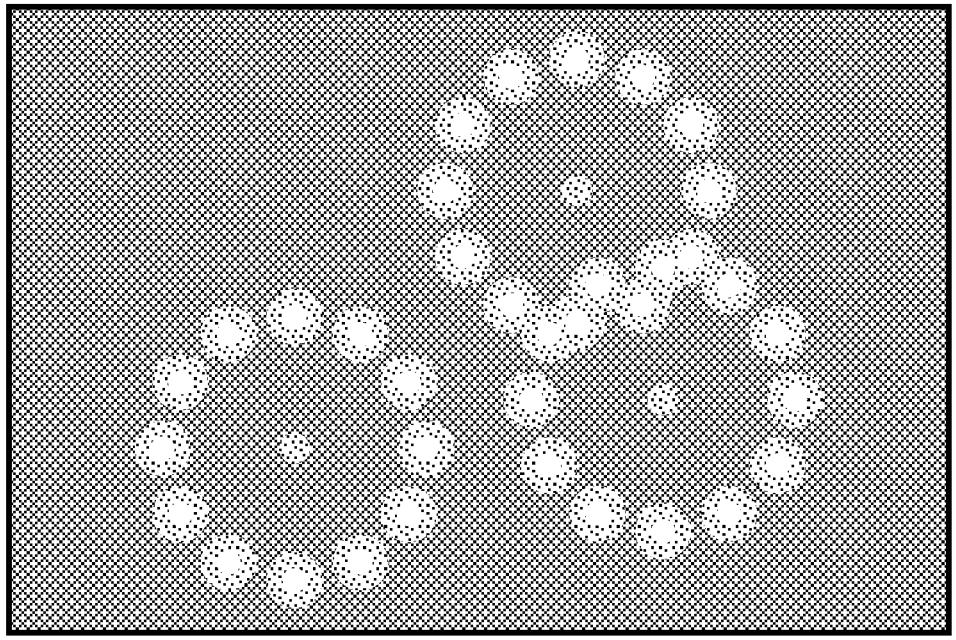
FIGS. 5 and 6 illustrate what a viewer would perceive when viewing two different light effect materials spaced apart from three LEDs.

In FIG. 5, a viewer at a certain distance views a circle of lights, such as twelve, about a central, dimmer light, all of which are produced by a single LED. This effect is conceptually illustrated in FIG. 7, albeit with a different number of lights, in which the squares without any cross hatching represent squares of the light effect material having microscopic elements that create a viewable effect whereas the squares with cross hatching do not create a viewable effect (at least at the particular distance from which the material is being viewed by a viewer).

Figure 6:
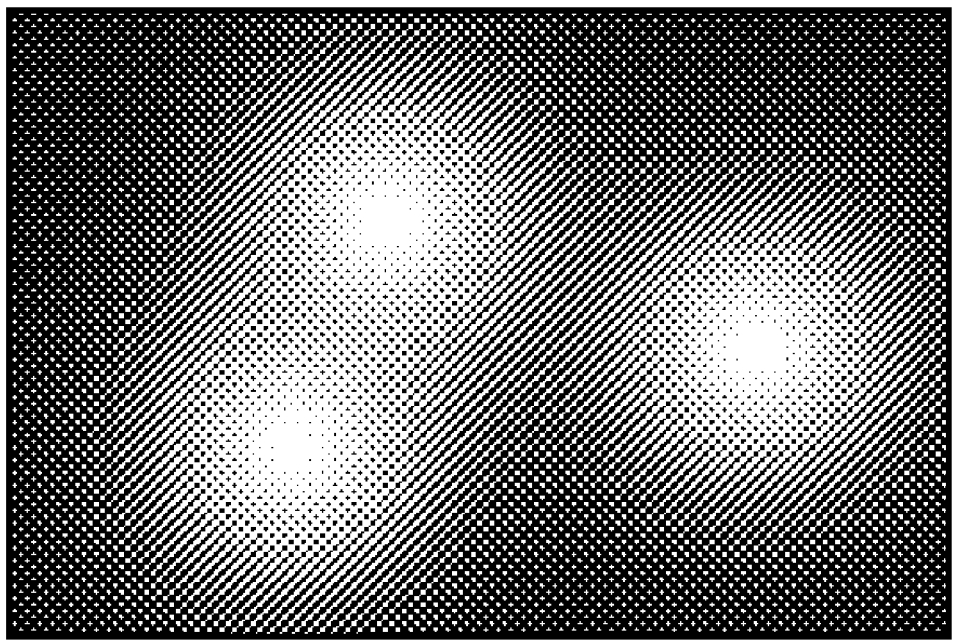

While FIG. 8 illustrates a light effect material in which microscopic elements are arranged in a mosaic pattern that can be used to achieve recognizable patterns, microscopic elements can also be arranged randomly, or nearly randomly, to achieve a different light effect, such as that which is illustrated in FIG. 6.

Another example of material that can function as a light effect material according to the present invention is a shiny filament fabric material, which may or may not be sheer, in which light appears to travel along structural fabric components to disperse light and create an optical effect. In such fabrics, the further the fabric is away from the light source, the greater the optical effect that is observable, up to a limit in which the effect is lost because the distance is too great.

Such a light effect material can be used on its own or affixed to another layer of material, such as, for example, transparent PVC, which can then be incorporated into the structure of an article of manufacture, one example of which is footwear.

Figure 10:
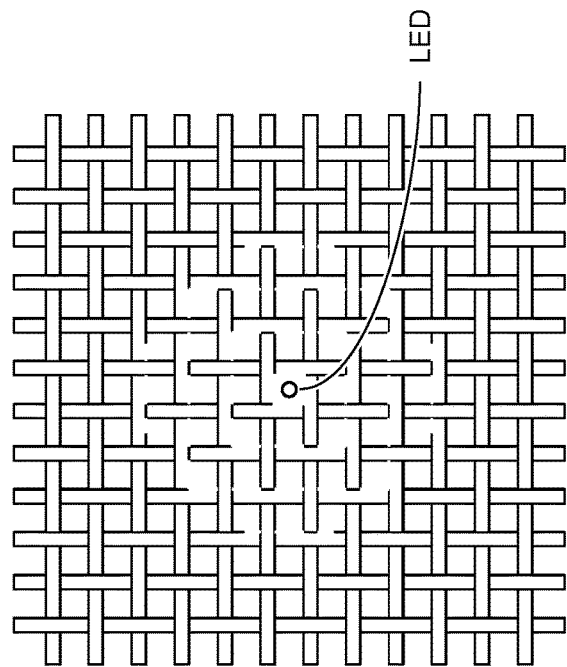
FIG. 10 illustrates one light effect material that uses shiny filament woven fabric with an LED being shown emitting light behind the fabric relative to a viewer viewing the LED from the opposite side of the fabric.

FIG. 10 illustrates a light effect material that uses a woven fabric material in which the shiny filaments of the woven fabric help create a light effect. As illustrated in FIG. 10, an LED is located behind the woven fabric light effect material and a viewer sees a light effect in which the linear fabric material is illuminated within a certain distance emanating away from a central point of the LED behind the light effect material relative to a viewer. The result, in this instance, is a design in which the light from a single LED is greatly enhanced to give a light effect more equivalent to that of several LEDs.

Figure 2:
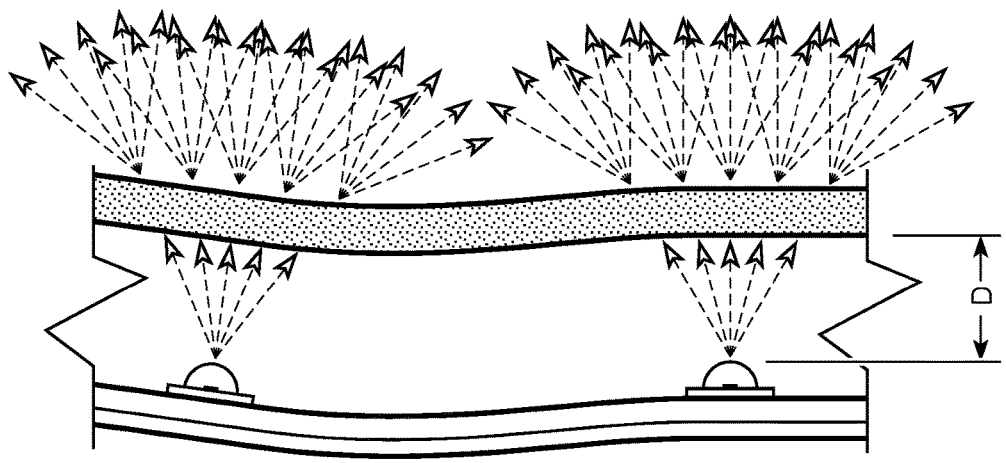
FIG. 2 illustrates a side view of multiple LEDs behind a light effect material.

Multiple light effect materials can be layered on top of each other to create a hybrid light effect. Thus, for example, two sheets of light effect material, such as are illustrated in FIGS. 2 and 7, can be layered on top of each other—in this example, the thickness of the light effect material, between its inner surface and its outer surface where the dispersive elements are located, serves as a transparent space between the two layers of dispersive elements located on the outer surface of the two sheets of light effect material, thus enhancing the hybrid light effect.

Accordingly, a variety of different light effect materials can be used to create different light effects. Common to all such materials is use of very small, or microscopic, elements which create visible light effects in which an LED is no longer viewed as simply a single point source of light, but as something more akin to that which is produced by additional LEDs.

One or more sheets of light effect material can be used as an outer surface of a lighting element, or they can be protected by an outer transparent layer. It is especially preferred, if an outer protective transparent layer is used, that the outer surface of a light effect material located next to the outer transparent layer material be sealed so that liquid, which may contain soap and the like, is not allowed to reach the dispersive elements of the outer surface of the light effect material during a wash cycle so that no residue is trapped or deposited on the dispersive elements that might diminish their light dispersive effect.

When a lighting unit is being manufactured, the light effect material and spacing mechanism can be thought of as half the unit, the other half being the LEDs and electronics used to power the LEDs, such as a power source (which can be one or more batteries), a control device powered by the power source for controlling electric current provided to the LEDs (which may have a light sequencer or timer or other electronics, all of which can be contained on a PCB), a switch (such as a motion detector switch, an example of which is U.S. Pat. No. 9,396,887) and one or more electrical connectors (such as conductive wires) to connect the LEDs to the control device. With such a construction, both of said halves, namely the lighting half and the electronics half, can be separated, if desired, or combined into a single unit and the LEDs can be mounted on a PCB with the other electronics, depending upon designer choice.

U.S. Pat. Nos. 9,863,615 and 10,145,546 disclose a lighting unit can be removably inserted into a pocket which can be made of light effect material.

In accordance with the disclosure of U.S. Pat. No. 9,863,615, a self-contained insertion assembly 400 is manufactured which contains all of the electronics and LEDs in a single assembled unit which can include (or not) a light effect material and is removably inserted into a pocket prepared in a garment or other item of manufacture. The pocket is designed to keep the unit correctly orientated if orientation is required for a switch while also allowing for easy removal and or replacement of one or more units and/or sheets of light effect material while still also allowing for a light effect to be visible outside of the pocket.

Figure 11:
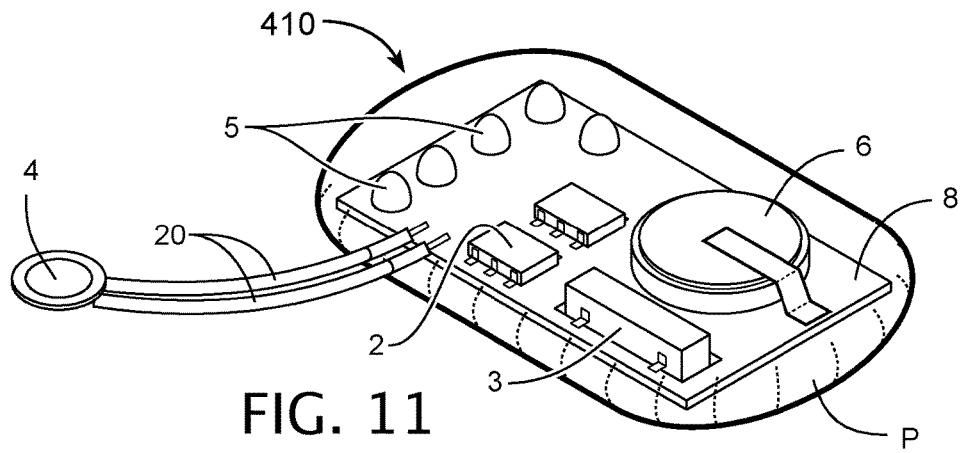
FIG. 11 illustrates an assembly in which all of the electronics, except for an on/off switch, are enclosed within a potting material.

As illustrated in FIG. 11, a battery 6 is directly mounted to a PCB 8 which also contains one or more LEDs 5, electronics 2 and a switch 3 (which may either be mounted directly to the surface of PCB 8 to which the other components are mounted or, if desired, mounted in a recess or hole formed in PCB 8 to reduce the elevation profile of switch 3). LEDs 5, electronics 2 and battery 3 are mounted to the same surface of PCB 8 and the LEDs are arranged so that a distance D between them and other components such as battery 6 and switch 3 minimizes light emitted from the LEDs coming into direct contact with the elevational profile of such components which will interfere with the pattern of light emitted due to shadow effects. If an on/off switch 4 is included, it can be connected by wires 20 to the same surface of PCB 8 to which LEDs 5 are mounted, as is illustrated in FIG. 11. The assembly described so far (but not on/off switch 4), once assembled, is encased in a clear potting material P to create an assembly 410. It is especially desirable that potting material P is used to create the transparent space with a preselected distance needed between LEDs 5 and light effect material 50 so as to create a light material viewing effect.

Figure 12:
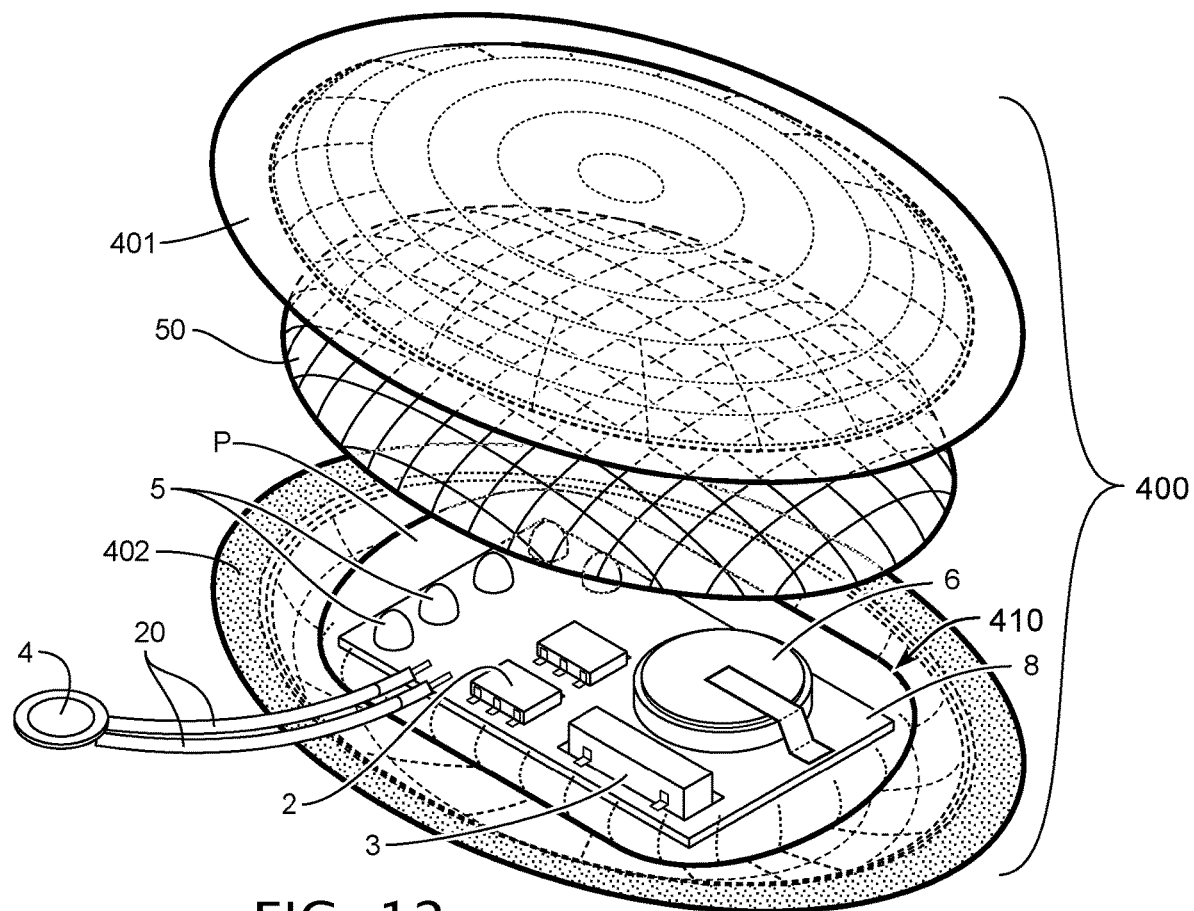
FIG. 12 is an exploded view which illustrates how the assembly of FIG. 11 can be included within another larger insertable assembly which can be inserted into a pocket as is illustrated in FIG. 13 in which two assemblies are each being inserted into a pocket, one also having an additional loose layer of light effect material being inserted with it into a pocket.
Figure 13:
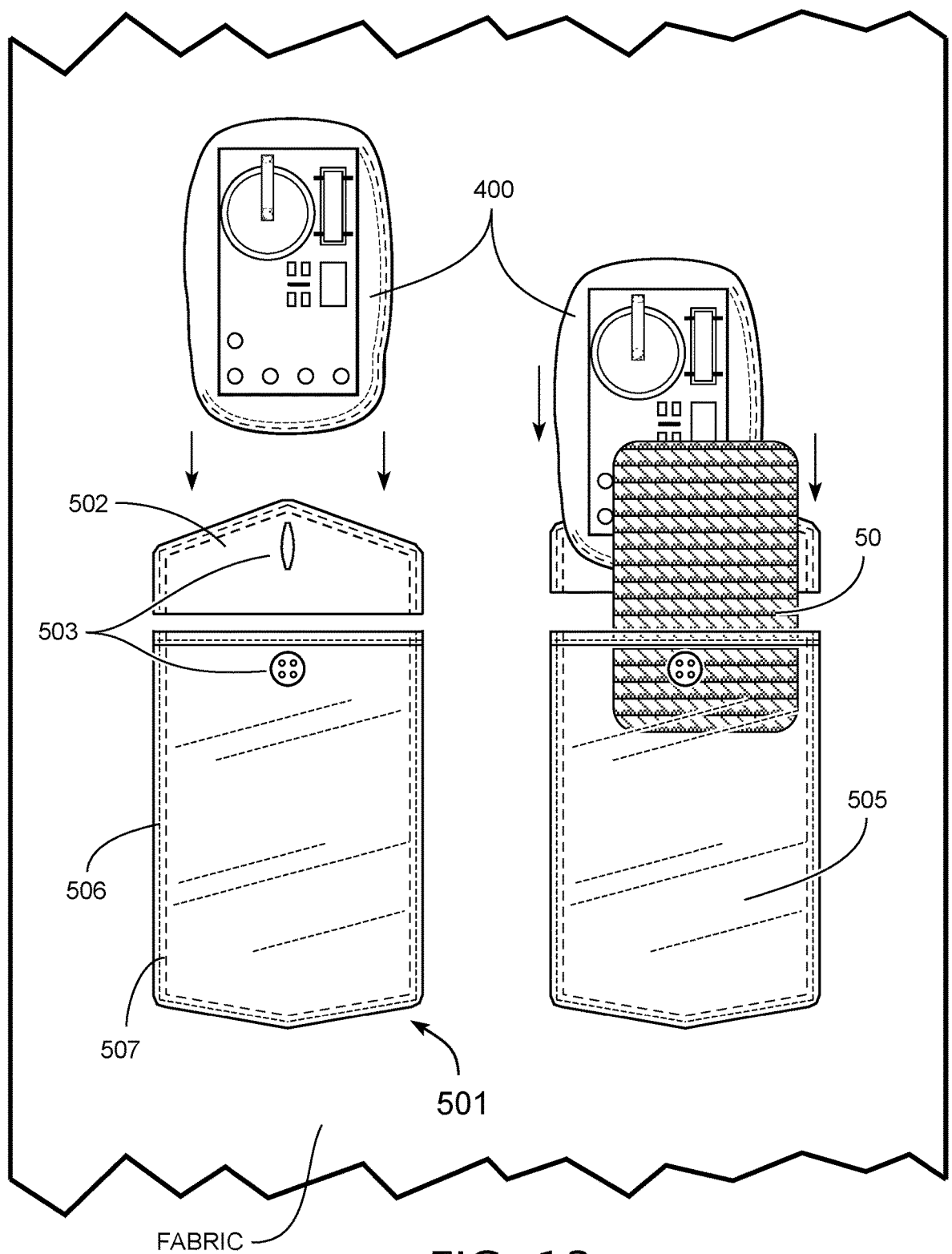

Assembly 410, in an especially preferred embodiment, is combined with light effect material 50 and two pieces of plastic material 401 and 402 to create a further assembly 400. It is especially preferred that plastic material 402 is self-sealing to plastic material 401 and allows for attachment 410 to be stuck to it. In an alternative embodiment, plastic material 401 may itself be a light effect material 50, thus removing the need for three sheets of material illustrated in FIG. 12. In another alternative embodiment, assembly 410 may be included within another structure, such as a clear envelope or the like, and then attached to light effect material 50 (e.g., by using clear adhesive or tape or the like), and then assembly 410 or assembly 400 and (any additional structure) and one or more sheets of light effect material 50 (all of which will hereinafter collectively be referred to in any combination or sub-combination, for ease of reference, as removable assembly 500) may be removably inserted into a pocket 501 designed for receiving removable assembly 500, an example of which is shown in FIG. 13.

It is desirable for pocket 501 to have some type of reversible closing mechanism 503 to retain removable assembly 500 within it, and such closure mechanism can take any number of forms, examples of which include, but are not limited to, a zipper, a snap, a button, or a hook and loop fastener, which may or may not use a separate flap of material 502 which partially covers pocket 501 and is used in connection with reversible closing mechanism 503. In an especially preferred embodiment, pocket 501 has a clear portion 505, a border 506 and some attachment mechanism 507 (e.g., stitching or heat seal) for attaching pocket 501 to a surface of a garment (such as a piece of clothing or shoe) or other article of manufacture (e.g., a backpack, toy or something else). Alternatively, pocket 501 itself might be attached to a surface, such as that of a cell phone, by an adhesive layer or the like. It is worth noting that clear portion 505 may include its own artwork or be comprised of light effect material 50, or have light effect material 50 attached to it, in alternative embodiments, and may also be a sheer material, rather than a clear material.

Use of multiple pockets 501 on a single surface or garment, especially when combined with multiple sheets of light effect material 50 that are easily combined or removed from a single pocket, and the possibility of differing removable assemblies 500 (which might have different numbers of LEDs, or colors of LEDs, or patterns of lighting) create the possibility of a great many customizable variations of light effect viewable on the single surface or garment. Also, multiple removable assemblies 500 and differing sheets of light effect material 50 might be sold in a kit for use in customizing a given garment or for use in replacing a removable assembly 500 in a given pocket or garment. Indeed, a garment with a specially designed pocket 501 might be sold or shipped separate from a removable assembly 500 designed for use in such garment.

In accordance with the disclosure of U.S. Pat. No. 10,145,546, a compact, inexpensive lighting assembly 600, illustrated in FIGS. 14-16, can be manufactured which is useful when combined with light effect material 50.

In an especially preferred embodiment, battery 6 is mounted to an underneath side 8U of PCB 8 through use of battery mount 6M while other electronic components are mounted on top side 8T of PCB 8 to produce a very compact electronic assembly 601. (Note that battery 6 can also be mounted on top side 8T if size is not an issue and a larger PCB is acceptable for a given application.) The electronic components mounted on top side 8T include multiple LEDs 5, electronics 2 and an on/off switch 4 (as well as a motion switch, if desired). PCB 8 can be a flexible circuit or use a rigid circuit board.

After electronic assembly 601 is assembled it is inserted into a first plastic piece 602 with a cavity 602C and bottom housing 602B so that top side 8T is more proximate to bottom housing 602B than underneath side 8U and then a second plastic piece 603 is placed over the first plastic piece 602 and sealed to form lighting assembly 600 which has a watertight seal which protects electronic assembly 601 which is now sealed between plastic pieces 602 and 603. The watertight seal may be made by any number of conventional sealing means, examples of which include a shrink wrap step, a heat seal, a sonic weld, a clamp, glue or some other sealing means, and it is desirable that any edges be rounded and/or softened so as to avoid sharp edges. It is important to note that it is especially desirable that depth 602D of cavity 602C be sufficient so that bottom plastic housing 602B is spaced apart from contact point 4C of on/off switch 4 so that applying pressure to bottom plastic housing 602B, such as by finger activation, causes bottom plastic housing 602B to bend down until contact is made with contact point 4C for either turning switch 4 on or off or for activating changes in different operational modes of LEDs, examples of which include a chase sequence, simultaneous blinking or all on at once. Also, depth 602D provides space between LEDs 5 and any light effect material 50 so as to create a light material viewing effect.

While it is possible that light effect material 50 can be used for bottom plastic housing 602B, it need not be, and light effect material 50 can be placed on or apart from bottom plastic housing 602B so as to create a lighting unit removably insertable within a pocket, or it can also be incorporated into an article of manufacture, such as a piece of jewelry, a novelty item or as a decorative patch.

First and second plastic pieces 602 and 603 can be made of any suitable material, such as materials in common use for clam shell packaging today, which means that production of lighting assembly 600 can be automated, and then lighting assembly 600 can be incorporated into a suitable article of manufacture, depending upon its intended use. It is especially desirable that plastic piece 602 be clear so as to allow light emitted from LEDs 5 to pass through it.

Lighting assembly 600 can be used to replace assembly 410, as previously described, or it can be used to replace assembly 400, as also previously described. It can be used to create removable assembly for insertion into a pocket, or it can be incorporated into an article of manufacture, such as a shoe, where it may or may not be replaceable, depending upon designer choice. And, because of the compact size in which a multi-LED lighting unit 600 can be produced, multiple lighting units 600 can be used in a given application, either with or without light effect material 50; for example, multiple lighting units 600 can be used in a given insert, with light effect material, for insertion into a pocket, so that the lighting units 600 can create different light material viewing effects designed to complement or enhance graphics included with the pocket insert or to be lighted by the pocket insert.

Figure 14:
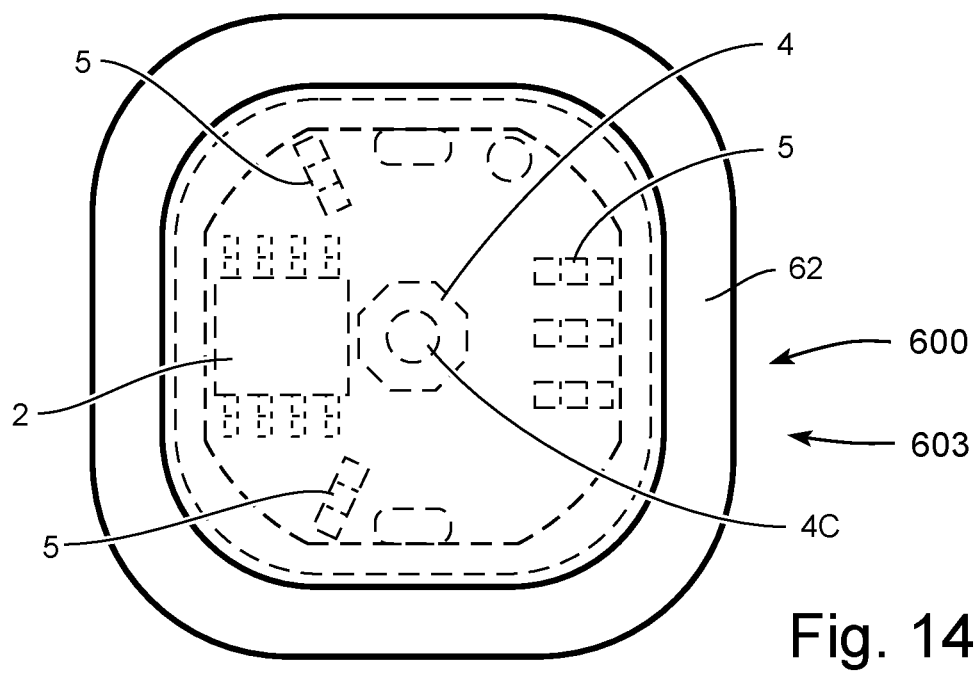
FIGS. 14 and 16 are, respectively, top and side views of the lighting assembly of FIG. 15 assembled.
Figure 15:
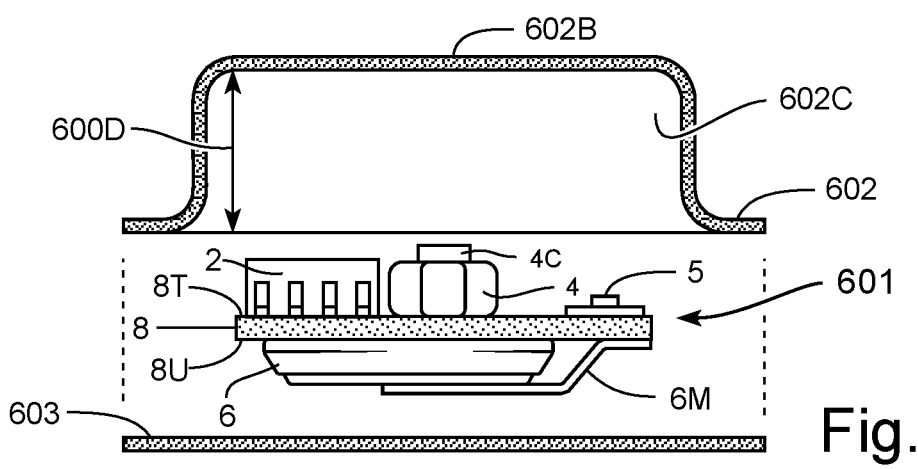
Figure 16:
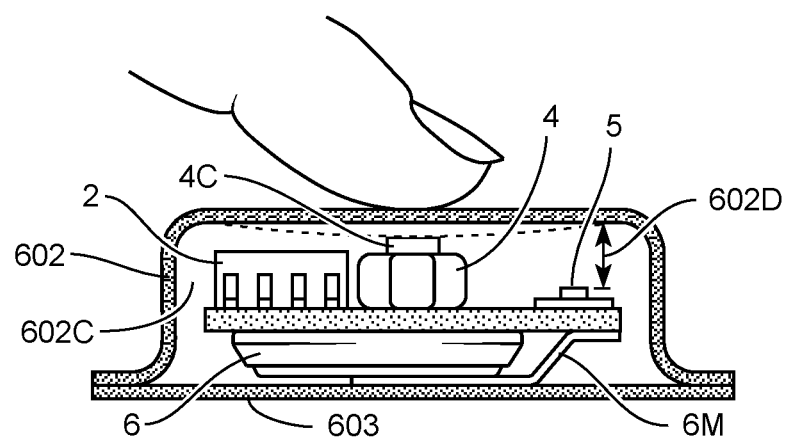

A pocket insert (or a similar article of manufacture which may also be secured to another article of manufacture by any suitable means, either permanently or removably), can include electronics 2 which include a controller, a motion activated switch and wireless connectivity, such as Bluetooth, so that any lighting unit, such as what might be placed in a pocket, can be remotely controlled by a portable personal electronic device, such as, for example, a cellphone, tablet, or computer. (Thus, it should be noted that electronics 2 is not necessarily a singular device as depicted in FIGS. 14-16, although it may be, depending upon desired electronics, designer choice and manufacturing considerations, an example of which might include use of an ASIC chip.) Furthermore, sound can be included in electronics 2 via one or more sound devices, and one or more controllers can coordinate sound and light material viewing effects, either with preprogrammed selections, or through wireless control via a portable personal electronic device, which might allow a user to coordinate preselected patterns via the means for providing wireless connectivity or control activation of noise device(s) and LEDs according to one or more user inputs transmitted from a portable personal electronic device.

U.S. Pat. No. 10,520,179 discloses a metalized layer can be added between a light effect material and the viewer so that components creating a light material viewing effect are masked by the metalized layer when the light material viewing effect is not activated whereas the metalized layer enhances a visual design (such as artwork) when the light material viewing effect is activated.

It has been previously disclosed that what I shall refer to as a "metalized layer" can be added outside of a light effect material relative to a ray path drawn from an LED and this metalized layer will create highly desirable visual effects. When the LED is not energized and producing light, the metalized layer will give the appearance of a metalized layer of material, thus hiding what is found underneath it; however, when the LED is energized, the light effect will still be created and visible on the metalized layer. To create this special visual effect, the metalized layer needs to contain a light deposition of metal, but not be opaque. The metalized layer can be its own layer of material attached to the light effect material or another layer located between the light effect material and the metalized layer. It is also contemplated that the metalized layer might be deposited on the outer surface of the light effect material (relative to an LED).

Figure 17:
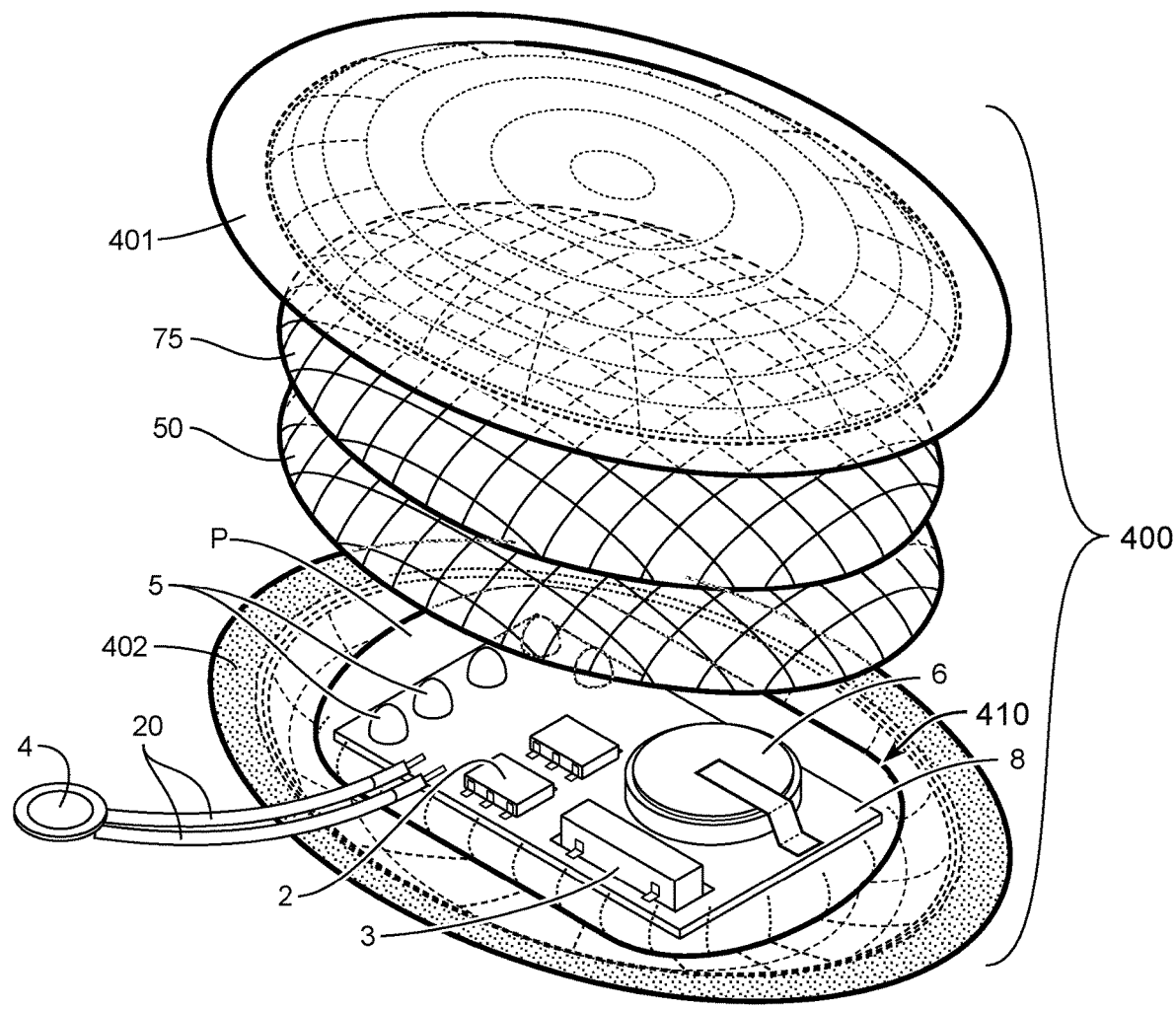
FIG. 17 is an exploded view which illustrates addition of a metalized layer to the assembly of FIG. 11.

Due to the visual effect created by the metalized layer when no light is creating a light effect, the metalized layer can be incorporated into an aesthetic design of an article of manufacture (e.g., but not limited to, clothing or shoes), one example of which might be to give the appearance of a metalized button, bar, square or other shape, so that the visible portion of an article of manufacture capable of creating a light effect is the visual image of the metalized layer when no light effect is being created. Thus, for example, a metalized layer 75 can be added to self-contained insertion assembly 400 previously described in FIG. 12 as is illustrated in FIG. 17. It should be noted that a metalized layer 75 can be used in any previous embodiment already described which creates a light effect.

Figure 18:
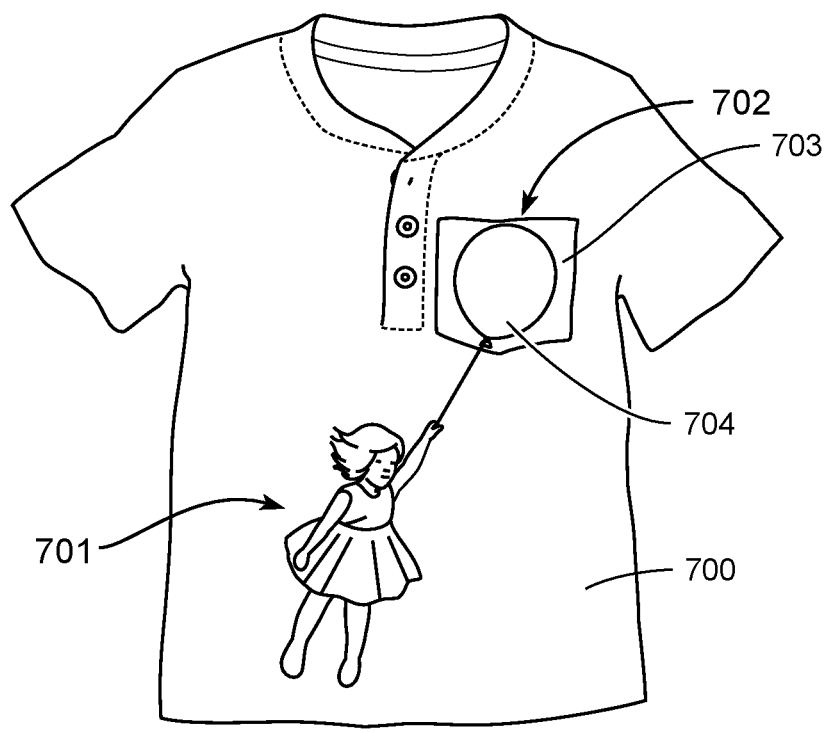
Figure 19:

Visual designs can also be created on the metalized layer (or on a light effect material or outer surface when it is not being used with a metalized layer) which take advantage of the light effect to highlight a portion of the aesthetic design or the light effect (visible either with or without a metalized layer) may be incorporated into a larger design of an article of manufacture, examples of which are illustrated in FIGS. 18 and 19.

FIGS. 18 and 19 also illustrate how a light effect material and/or metalized layer can be incorporated into the design of an article of manufacture, such as a garment or shoe, as a pocket-like receptacle for receiving an electronic assembly used to create a light effect. In the example illustrated in FIGS. 18 and 19, an article of manufacture, such as shirt 700, contains artwork 701 which includes a portion of artwork 702 which incorporates an active light effect into its design; the additional artwork can be incorporated in a light effect material or metalized layer, either of which themselves could be incorporated into the article of manufacture, such as shown in FIGS. 18 and 19 as pocket 703. Once the light effect is activated, as illustrated in FIG. 19 as 705, the light effect now adds an electronic effect to artwork 701 (and, if present, 702). In FIGS. 18 and 19, a self-contained insertion assembly 400 can be added inside of pocket 703 and this assembly can have extended sides of material (see FIG. 13) so that it fits the pocket and makes it large enough so that it will not represent a choking hazard to young children. The pocket, as already discussed earlier, can have a closure mechanism to hold the self-contained insertion assembly 400 inside of it. Another advantage of such a design is ease of manufacturing assembly, given that the pocket can be made directly in the article of manufacture and then a self-contained insertion assembly 400 can easily be inserted into the pocket (and, if desired, closed within the same); further, such a design facilitates the use of multiple self-contained insertion assemblies, and multiple pockets create opportunities for personal customization.

Accordingly, the addition of a metalized layer greatly increases designer choice and aesthetic designs that can be created with a light effect material. The metalized layer can cover all of the light effect material or less than of the light effect material, depending upon designer choice.

It has also been disclosed that light effect material may be incorporated into a flap which extends down over all, or substantially all, of the length of a pocket (rather than just being a top flap, as is illustrated in FIG. 13) while a lighting module is held within the pocket, the spacing between the flap and the lighting module held within the pocket creating the needed distance, or additional distance, between the light source and the light effect material so as to create or accentuate a light material effect. Of course, if the flap also contains a transparent spacing material (e.g., bubble wrap or the like) the transparent spacing material, plus the natural spacing between the flap and the pocket, can be used in creating a light material effect. Also, if the flap is not secured, and it is allowed to move around during physical activity, such as when a person wearing a garment is physically active, movement of the flap will cause the light material effect to vary, due to the varying distance between the light effect material on the flap and the lighting module held within the pocket.

Further, a metalized layer can be used as a reflected light source to create what I shall refer to as a reflected light material effect when the metalized layer is appropriately positioned and spaced apart from, and behind, the light effect material, in a viewing path relative to a viewer's eye. This surprising effect has been found to work in daylight, and other strong light sources, thus creating a new light effect, which does not require electronics.

Figure 20:
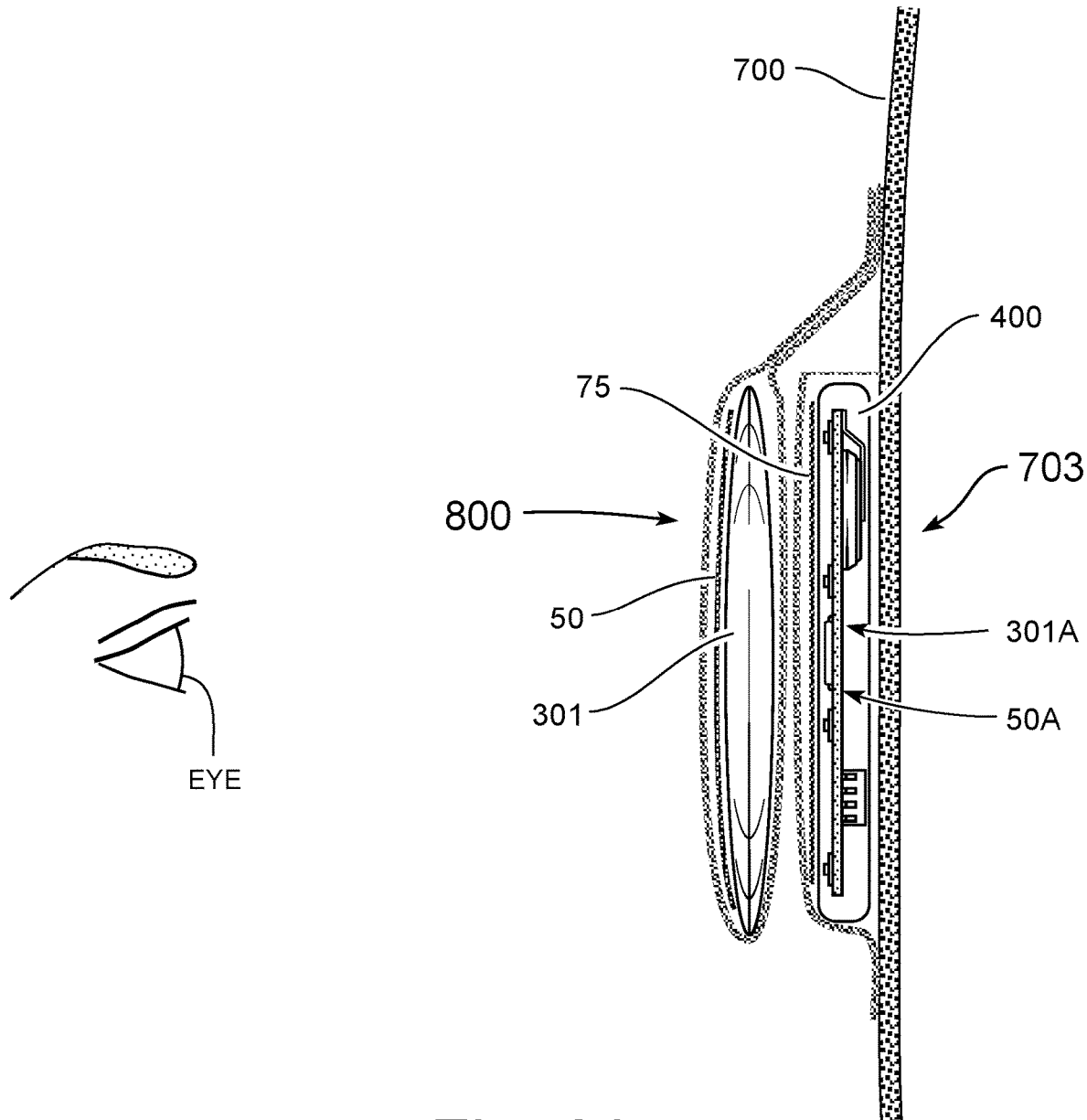
FIG. 20 is a side view which illustrates both use of a large flap covering a pocket as well as use of a metalizing layer (by itself or with a light unit) to create a light effect in accordance with the present invention.
Figure 21:
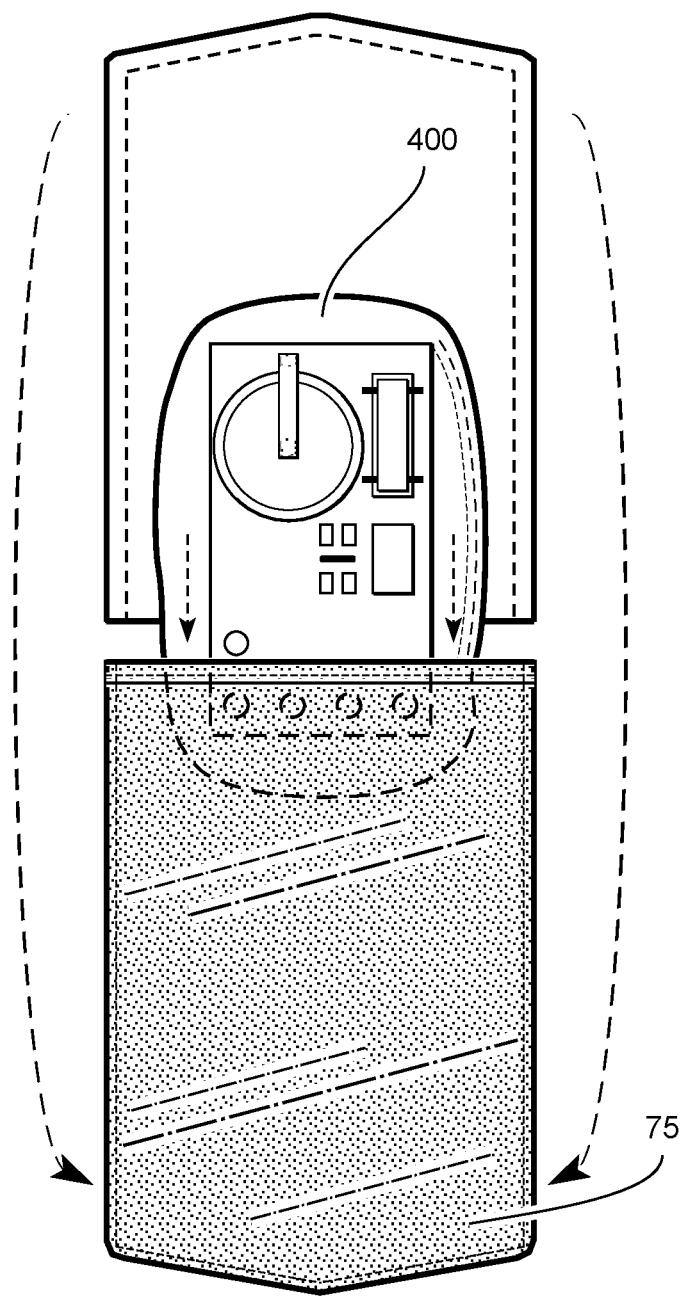
FIG. 21 is a front view of FIG. 20 with the extended flap raised up above the pocket.

FIG. 20 illustrates a metalized layer 75 constructed as a pocket, generally designated 703, placed on an article of manufacture 700 with a self-contained insertion assembly 400 held within pocket 703. An extended flap, generally designated 800, hangs down over and, in an especially preferred embodiment, either covers or substantially covers, outside of pocket 703. Light effect material 50 is configured on or near the outside of extended flap 800 which is illustrated as having a transparent spacer material 301. Extended flap 800 can be secured in place by any suitable means, examples of which include a button and hook and fastener materials, or allowed to simply hang free. Extended flap 800 can be affixed to pocket 703 or article of manufacture 700 by any suitable means. When lighting module 400 is used in such an embodiment, it can be used to create a light material viewing effect with light effect material 50 or, alternatively, to create a second light material viewing effect through use of a second layer of light effect material, generally designated 50A, positioned between metalized layer 75 and LEDs of lighting module 400, either as part of the pocket, as part of the lighting module or as a separate insert placed in the pocket; in such an embodiment, a second transparent spacer material 301A can be created between second layer of light effect material 50A and LEDs of lighting module 400 by any suitable means already discussed above for creating a transparent spacing layer. It should also be noted that the second light material viewing effect just mentioned may not be visible by itself when extended flap 800 covers pocket 703, although it can be additive, in much the same way it was earlier discussed that use of two different light effect materials can be used to create different visual effects.

Figure 22B:
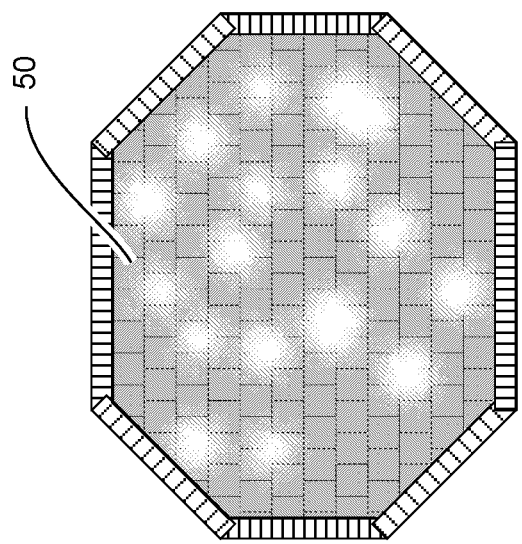
Figure 22A:
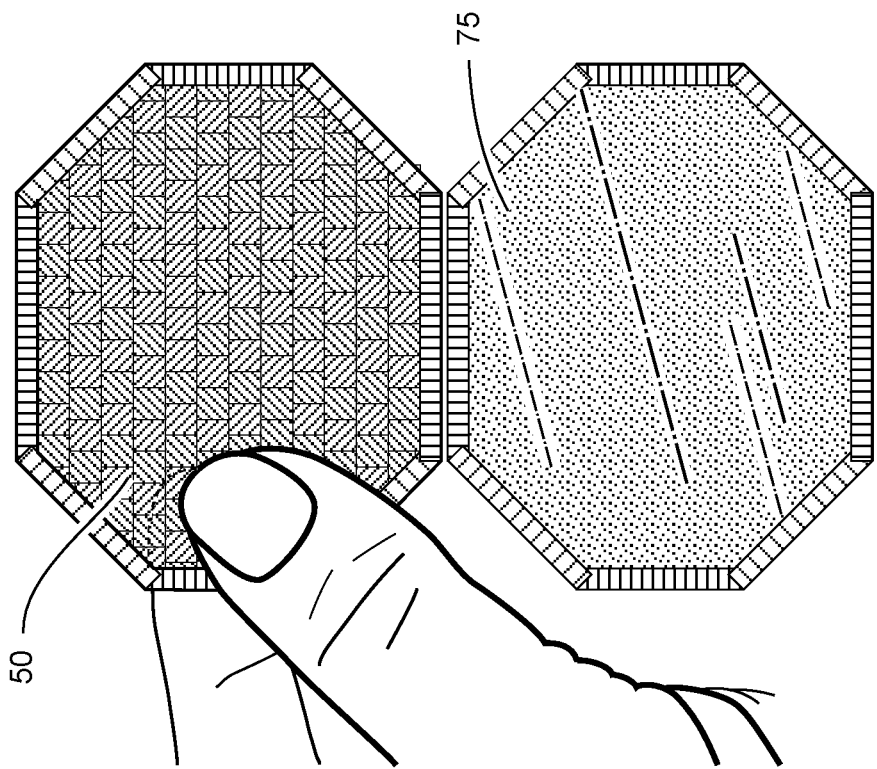
FIG. 22A illustrates the flap with the light effected material lifted away from the metalizing layer.

FIG. 22 illustrates a reflected light material effect created in accordance with the present invention. Reflective metalized layer 75 disperses reflective light over the inner surface of light effect material 50 which is, in effect, broken up to create sparkles or another light effect as it leaves outer surface of light effect material 50, instead of simply reflecting light to a viewer, as would be the case when the reflected light is not dispersed by light effect material 50.

This brings us now to the new disclosure of the present invention, which builds upon my past disclosures.

Figure 23:
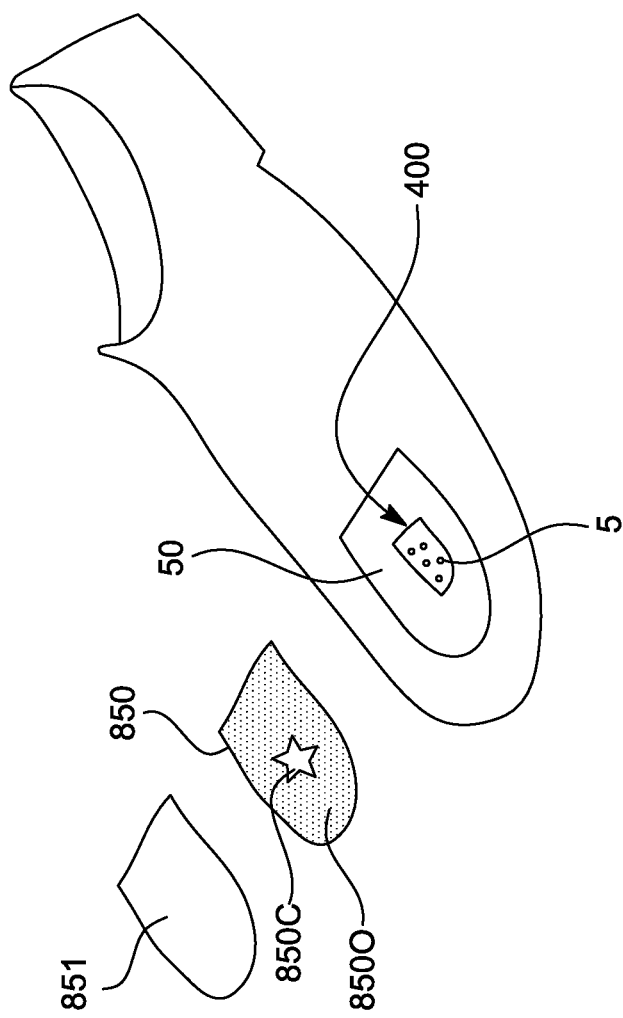
Figure 24:
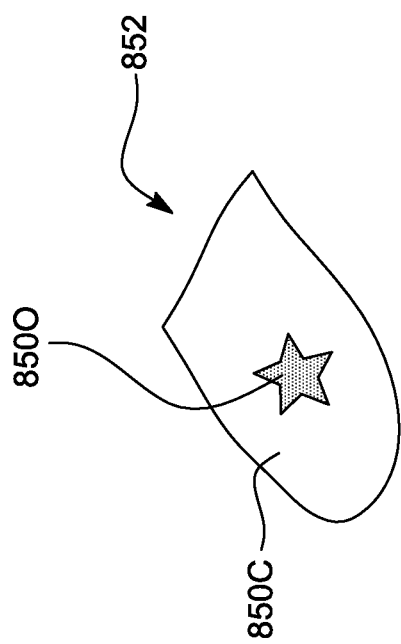
FIG. 24 illustrates a negative image of the desired design where the desired design is opaque.

In accordance with the present invention, an opaque layer is used to block light and create a desired design which is lit up by light effect material as previously described, and a metalized layer may optionally cover the desired design. In an especially preferred embodiment, an electronics module with LEDs 50 and a battery, such as insertion assembly 400, is located in an object of manufacture, especially preferred examples of which include clothing and shoes, light effect material 50 is appropriately located spaced apart from one or more LEDs 50 so as to create a light material viewing effect, and then a composite layer with a desired design having an opaque portion and a transparent portion is situated such that the light material viewing effect lights up the desired design. The result is a novel viewing effect in which the light material viewing effect lights up the desired design, preferably lighting up substantially all of the transparent portion, thus creating a very eye-catching desired design. The desired design can take any number of forms, such as shapes, names, words, numbers, trademarks, logos, silhouettes and the like, one example of which is illustrated in FIG. 23 in which a material 850 has an opaque portion 850O and a clear desired design portion 850C. Alternatively, a negative image of the desired design can be created, as illustrated in FIG. 24, by making the desired design be the opaque portion 850O while the rest of material 850 is opaque portion 850O.

In accordance with the present invention, material 850 can be located either between an LED light source and the light effect material, or, more preferably, be located further away from the LED light source than the light effect material, as is illustrated in FIG. 23. Material 850 can be constructed of one layer, as is illustrated in FIG. 24 where opaque design 850O might be printed onto clear layer 850C, or be constructed of multiple layers which might include a clear protective covering 851. In addition, material 850 and light effect material 50 can be combined into a single layer, such as by lamination.

In an especially preferred embodiment, material 850 might be constructed so that it is easily removably inserted into a holding mechanism, one example of which might be an insert like 50 into pocket 505 illustrated in FIG. 13. An advantage of this construction, in which light effect material 50 is not removable, is that multiple materials 850, with different desired designs, can be used in a single article of manufacture, which allows for great interchangeability and customization for individual circumstances at different times, and the article of manufacture can be sold as a kit which includes multiple materials 850 for customization. Another advantage of such construction is that the article of manufacture can be manufactured without regard to what particular desired design will be used, and then such article of manufacture can be customized at a point of sale, or even after the point of sale. For example, think of a piece of clothing, like a shirt, which is configured so that material 850 can be inserted into a pocket-like structure, and then material 850 might be customized for an individual player's number, or a team logo or mascot, or different corporate sponsor logos. For purposes of this disclosure, "pocket" includes pocket-like structures, the key functional feature being not that all or any sides are continuous, as they can have gaps, but that the structure allows material 850 to readily be inserted into, and removed, from the "pocket," which holds material 850, and which also means such structures may include sleeves and other structures, and may or may not have flaps or means to close the "pocket" and prevent material 850 from being moved into or out of it without activation or deactivation of such closure means. An advantage of such design is customization and specialty marketing without the need for inventory of the actual articles of manufacture containing the desired design, which might in fact be sold or provided separately; thus, instead of having to carry articles of manufacture with every team in a sports league, a single master form of the article of manufacture can be manufactured and then sold for any team in the sports league, with a customized material 850 being provided for use by each sports team.

It is also worth noting that material 850 might be customized by an individual end-user. Such a user might apply an opaque material to a clear surface (e.g., think of using opaque paint or pen to, in essence, color in a desired design 850O in FIG. 24) or remove opaque material from a solidly opaque surface to create a desired design (similar to 850C in FIG. 23) which could then be inserted into a holding structure in an article of manufacture (e.g., a pocket-like structure) so as to create a uniquely personal, customized, individual desired design in which a new viewing effect is created in which the individualized custom desired design is lighted by a light viewing effect.

Although the foregoing detailed description is illustrative of preferred embodiments of the present invention, it is to be understood that additional embodiments thereof will be obvious to those skilled in the art. Further modifications are also possible in alternative embodiments without departing from the inventive concepts already described.

Accordingly, it will be readily apparent to those skilled in the art that still further changes and modifications in the actual concepts described herein can readily be made without departing from the spirit and scope of the disclosed inventions.

What is claimed is:

1. An article of manufacture, comprising:
   a composite layer having an opaque portion and a transparent portion;
   a light effect material;
   an electronic assembly configured with one or more light emitting diodes ("LED") and electronics for causing the one or more LEDs to emit light when it is energized; and
   a transparent space configured between the light effect material and the one or more LEDs;
   wherein the light effect material has an inner surface and an outer surface, the outer surface having a plurality of dispersive elements, said light effect material being configured so that light reflected from the one or more LEDs is dispersed by the plurality of dispersive elements so as to create a light material viewing effect;
   wherein the light material viewing effect is created for a viewer viewing light reflected from a preselected location of the light effect material through a first viewing path that begins with the one or more LEDs, then goes through the transparent space, then goes through the inner surface, then goes through the outer surface, then goes to the viewer;
   wherein a non-reflected light material viewing effect is created for the viewer viewing light through a second viewing path in which the light effect material has been removed and the second viewing path begins with the one or more LEDs, then goes through the transparent space, then goes to the viewer;
   wherein the viewer perceives the reflected light material viewing effect as a dispersed light effect viewing pattern when compared to the non-light material viewing effect when the first viewing path and the second viewing path have an identical preselected distance; and
   wherein the composite layer is configured so that the light material viewing effect lights up the desired design.

2. The article of claim 1, wherein the desired design is configured in the transparent portion.

3. The article of claim 1, wherein the desired design is configured in the opaque portion.

4. The article of claim 1, wherein the composite layer is comprised of a plastic layer with an opaque material printed onto the plastic layer.

5. The article of claim 1, wherein the composite layer is comprised of a transparent layer with an opaque material added to the plastic layer.

6. The article of claim 1, wherein the composite layer is comprised of an opaque layer from which opaque material has been removed to form the transparent portion.

7. The article of claim 1, wherein the composite layer is comprised of an opaque layer and a transparent layer.

8. The article of claim 1, wherein the composite layer is further comprised of a protective layer.

9. The article of claim 1, wherein the composite layer is removably attached to the article of manufacture.

10. The article of claim 9, wherein the composite layer is held within a pocket enclosure.

11. The article of claim 1, wherein substantially all of the transparent portion is illuminated by the light material viewing effect.

12. The article of claim 1, wherein the composite layer is located in the first viewing path between the outer surface and the viewer.

13. The article of claim 1, wherein the composite layer and the light effect material comprise a laminated structure.

14. The article of claim 13, wherein the composite layer is located in the first viewing path between the inner surface and the transparent space.

15. An article of manufacture, comprising:
   a pocket configured to receive a composite layer having an opaque portion and a transparent portion;
   a plurality of composite layers;
   a light effect material;
   an electronic assembly configured with one or more light emitting diodes ("LED") and electronics for causing the one or more LEDs to emit light when it is energized; and
   a transparent space configured between the light effect material and the one or more LEDs;
   wherein the light effect material has an inner surface and an outer surface, the outer surface having a plurality of dispersive elements, said light effect material being configured so that light reflected from the one or more LEDs is dispersed by the plurality of dispersive elements so as to create a light material viewing effect;
   wherein the light material viewing effect is created for a viewer viewing light reflected from a preselected location of the light effect material through a first viewing path that begins with the one or more LEDs, then goes through the transparent space, then goes through the inner surface, then goes through the outer surface, then goes to the viewer;
   wherein a non-reflected light material viewing effect is created for the viewer viewing light through a second viewing path in which the light effect material has been removed and the second viewing path begins with the one or more LEDs, then goes through the transparent space, then goes to the viewer;
   wherein the viewer perceives the reflected light material viewing effect as a dispersed light effect viewing pattern when compared to the non-light material viewing effect when the first viewing path and the second viewing path have an identical preselected distance;
   wherein the composite layer is configured so that the light material viewing effect lights up the desired design; and
   wherein the pocket is configured so that one of the plurality of composite layers is removably insertable into said pocket.

* * * * *